(12) United States Patent
Fujii et al.

(10) Patent No.: US 7,945,291 B2
(45) Date of Patent: *May 17, 2011

(54) COMPUTER SYSTEM PROVIDING SELECTIVE WIRELESS NETWORK ENABLEMENT

(75) Inventors: Kazuo Fujii, Yokohama (JP); Masaharu Itoh, Yamato (JP); Kozo Matsunaga, Sagamihara (JP); Shunya Uno, Fujisawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 640 days.

This patent is subject to a terminal disclaimer.

(21) Appl. No.: 11/933,021

(22) Filed: Oct. 31, 2007

(65) Prior Publication Data

US 2008/0126570 A1    May 29, 2008

Related U.S. Application Data

(63) Continuation of application No. 10/417,583, filed on Apr. 17, 2003, now Pat. No. 7,333,834.

(30) Foreign Application Priority Data

Apr. 18, 2002    (JP) .................................. 2002-116767

(51) Int. Cl.
    *H04M 1/00*        (2006.01)
    *H04M 1/38*        (2006.01)
(52) U.S. Cl. ..... 455/558; 455/559; 455/557; 455/556.1; 455/566.2; 455/550.1

(58) Field of Classification Search ............... 455/550.1, 455/556.1, 557, 455, 558, 556.2, 559, 562.1
See application file for complete search history.

(56) References Cited

U.S. PATENT DOCUMENTS

| | | | | |
|---|---|---|---|---|
| 5,761,447 A * | 6/1998 | Knox et al. | ................... | 710/303 |
| 6,125,283 A * | 9/2000 | Kolev et al. | ................... | 455/527 |
| 6,173,352 B1 * | 1/2001 | Moon | ......................... | 710/301 |
| 6,173,405 B1 * | 1/2001 | Nagel | ............................. | 726/21 |
| 6,721,556 B2 * | 4/2004 | Tezuka et al. | ................. | 455/410 |
| 6,870,733 B2 * | 3/2005 | Castell et al. | ............... | 455/556.1 |
| 7,072,691 B2 * | 7/2006 | Cromer et al. | ................ | 455/558 |
| 7,197,298 B2 * | 3/2007 | Azuma | ........................ | 455/411 |
| 7,290,716 B2 * | 11/2007 | Ito | .................................. | 361/737 |
| 7,395,975 B2 * | 7/2008 | Ito | .................................. | 235/492 |
| 7,577,424 B2 * | 8/2009 | Sinha et al. | ..................... | 455/423 |
| 2002/0183013 A1 * | 12/2002 | Auckland et al. | ............... | 455/73 |
| 2006/0031550 A1 * | 2/2006 | Janik et al. | .................... | 709/231 |

* cited by examiner

Primary Examiner — Tilahun Gesesse
(74) Attorney, Agent, or Firm — Ference & Associates LLC

(57) ABSTRACT

A computer system is provided with an antenna which disables inappropriate wireless communications when a communication controller is inconsistently connected with the antenna. The computer having a diversity antenna connected to a detachable wireless LAN card containing a controller for providing wireless communication is mounted in a mini PCI slot, comprising a switch device for recognizing the identification information (ID) of the wireless LAN card to be mounted by BIOS executed on a CPU, in which the connection between the diversity antenna and the wireless LAN card is maintained in an off state (default) as an initial state in which the wireless LAN card is mounted, and the connection is enabled based on the identification information recognized by the BIOS.

4 Claims, 5 Drawing Sheets

COMPUTER SYSTEM PROVIDING SELECTIVE WIRELESS NETWORK ENABLEMENT

CROSS-REFERENCE TO RELATED APPLICATIONS

This application is a continuation application of Japan patent application No. 2002-116767 which has a filing date Apr. 18, 2002 and U.S. patent application Ser. No. 10/417,583 filed on Apr. 17, 2003 now U.S. Pat. No. 7,333,834, the contents of which are hereby incorporated by reference in its entirety.

BACKGROUND OF THE INVENTION

The present invention relates to a computer, and more particularly to a computer capable of connecting a function expansion device such as a network card.

In recent years, computers such as laptop personal computers (note PC) increasingly have a wireless LAN function for connecting the apparatuses without employing a cable to construct a network. In the conventional cable LAN, all the apparatuses on the network are physically connected by employing cables, whereby complex wiring is required. Since it is not possible to make a connection to the network from a location without a port installed, some preparation was also needed when using the apparatus at other locations than a fixed location, including copying the data at the time of presentation. However, a wireless LAN enables an organization to build a more flexible office environment, with various restrictions of the wired or cable LAN removed.

The greatest feature of this wireless environment is the capability of communicating the information with other apparatuses without employing wires or cables. There are various kinds of specifications, including "IR (infrared communication)", "Bluetooth", and "WiFi". For example, in effectively utilizing the fast broadband Internet, it is preferable to construct the wireless environment having high communication rates in conformance to "Wi-Fi" based on the international standards IEEE802.11. The IEEE802.11 High-Rate standards are promoted by WECA (Wireless Ethernet Compatibility Alliance) to assure mutual operability between products, in which the product with approved compatibility is marked with a "Wi-Fi" logo. The IEEE802.11 standards include IEEE802.11b using the 2.4 GHz band with a maximum transfer speed of 11 Mbps (Mega bits per second), and IEEE802.11a using the 5 GHz band with a nominal speed of 54 Mbps.

On the other hand, the computer represented by the note PC is able to mount a function expansion card such as a PCI card or a Mini PCI card to expand the memory or make various inputs and outputs such as extending the modem function. The mounting methods include mounting the card on a motherboard (main substrate) of the computer, and fitting it into a slot. For example, in a case where the function expansion card was employed to implement the wireless LAN function, conventionally, the function expansion card itself had an antenna attached, and a controller for the wireless LAN communication within the expansion card along with the antenna was certified with the approval of the FCC (Federal Communications Commission), for example.

However, the antenna that can be provided in the function expansion card is restricted in the arrangement and size of antenna, and difficult to enhance its performance. Thus, some note PCs have a wireless antenna overhung from the liquid crystal panel portion, or contain a high performance antenna in the main body of the note PC employing the peripheral part of the liquid crystal panel portion.

Herein, in gaining the specification approval or certification, it is required that the wireless antenna provided in the main body and the controller are approved integrally. If a communication function is packaged on the main substrate for the note PC, the design is simplest. However, since a wireless LAN is required to have approval from each country it is sold in, a main substrate may potentially be produced differently for each country in order to satisfy each country's requirements, if this function is on-board. Considering configuration flexibility and future expansion needs, it is not preferable to package the wireless LAN controller directly attached on the main substrate. Thus, even when the wireless antenna is employed on the main body, it is preferable to mount the controller not on the main substrate but on a function expansion card using a connector attached to the main substrate.

On the other hand, when the specification approval is obtained in a state where the wireless antenna and the controller are separated, it is necessary to limit the controller mounted in the system of the note PC. That is, since the wireless antenna and the controller are integrally placed under the specification approval, it is not allowed to make communication via the wireless antenna mounted on the note PC in combination with the unapproved controller connected to the system. As a method for preventing unapproved combinations, it is conceived to impose the restriction on the hardware, such as using a unique connector. However, it is difficult to make the connector unique, and clarify "What is unique?", whereby this method is less valid to prevent the unapproved combinations.

The present invention has been achieved to solve the above-mentioned technical problems, and it is a purpose of the invention to provide a computer with an antenna in which the wireless communication is disabled via a communication controller that is not certified or approved to be used in combination with the antenna.

SUMMARY OF THE INVENTION

In order to achieve the above purpose, the present invention provides a computer having a wireless antenna and capable of mounting a device for wireless communication, comprising recognition means for recognizing the identification information of the device to be mounted, and switching means for keeping the connection in the off state between the wireless antenna and the device while in an initial state in which the device is mounted, and switching the switch to the on state allowing wireless transmissions across the connection based on the identification information recognized by the recognition means. That is, the connection between the wireless antenna and the device is turned off at default, whereby it is possible to disable the wireless communication if the device having no specification approval is connected.

The computer may further comprise storage means for storing the supported device information for enabling the connection with the wireless antenna, in which the switching means switches on the connection when the identification information recognized by the recognition means and the supported device information stored in the storage means are matched. Also, the supported device information stored in the storage means may be the identification information of a network controller that has the specification approval in combination with the wireless antenna for the wireless communication.

Further, the device is a card having multiple functions including a wireless LAN function. Other functions include a modem function. For example, in the case where the wireless LAN function involves the network controller having no specification approval, the wireless LAN function alone is disabled, while other functions are active, by keeping off the connection with the wireless antenna.

From another point of view, the invention provides a computer comprising storage means for storing the information of the network card having the specification approval in combination with the wireless antenna for the wireless communication, recognition means for recognizing the identification information of the network card mounted on the computer, abort means for aborting a start sequence when the identification information recognized by the recognition means and the information stored in the storage means do not match, and display means for displaying the information indicating that the network card having no specification approval is connected before the abort means aborts the start sequence.

Moreover, this invention provides a wireless system setting method for a computer having a wireless antenna and capable of mounting a device for the wireless communication, the method comprising a step of recognizing the identification information of the network card mounted on the computer, a step of determining whether or not the device is supported by the computer based on the recognized identification information, and a step of turning on a switch with the connection between the wireless antenna and the device kept off in an initial state in which the device is mounted, if the device is supported by the computer.

Here, whether or not the device is supported by the computer may imply whether or not the device contains a network controller having the specification approval in combination with the wireless antenna. Therefore, in the laptop computer (note PC), it preferably copes with the specification approval for the wireless LAN without providing the network controller on the motherboard.

Moreover, the invention provides a wireless system setting method comprising a step of recognizing the identification information of the device mounted on the computer, a step of determining whether or not the device contains a network controller having the specification approval in combination with the wireless antenna for the wireless communication based on the recognized identification information, a step of aborting a start sequence when it is determined that the device does not contain the network controller having the specification approval, and a step of displaying the information indicating that network controller having no specification approval is connected before aborting the start sequence.

The above inventions can be implemented as a program that is executed on the computer using the BIOS that performs each of the functions. In this case, the program for implementing each of the functions may be stored in a storage medium that is readable by the computer. This storage medium may be a CD-ROM medium, for example. The program is read by a CD-ROM reader in the computer and stored in various kinds of memory such as a hard disk, and then executed. Also, the program may be distributed to the computer such as a laptop PC via a network by a program transmission apparatus.

The above summary of the invention does not enumerate all of the necessary features for the present invention, but some combinations of these features may be also inventive features.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE
ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The present invention will be described in detail with respect to an embodiment thereof with reference to the accompanying drawings.

Figure 1:
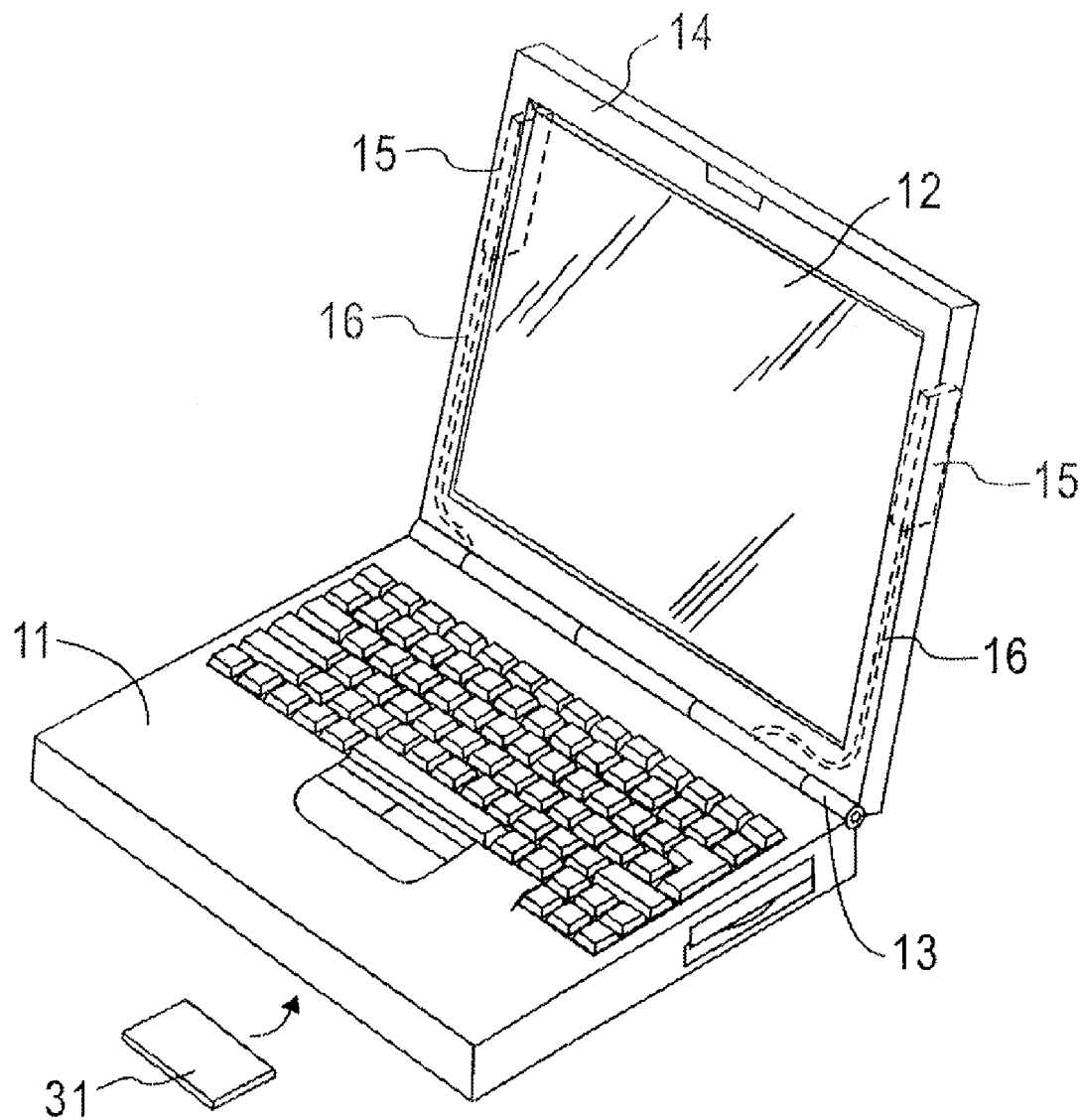
FIG. 1 is a view showing the constitution of a computer according to an embodiment of the present invention.

Referring now more particularly to the accompanying drawings, FIG. 1 is a view showing the constitution of a computer according to an embodiment of the invention. As shown in FIG. 1, the computer, for example, is a laptop personal computer (note PC), comprising a base portion 11 having a keyboard and a track point and a display panel 12 composed of an LCD, in which the display panel 12 is made rotatable via a hinge portion 13. The display panel 12 is enclosed by a display panel periphery part 14. A diversity antenna 15 as the wireless antenna is provided on either side of the display panel 12 and inside the display panel periphery part 14, and connected via a cable 16 to a wireless LAN card 31 fitted into the base portion 11. This wireless LAN card 31 as a function expansion device is fitted into a motherboard (not shown) provided inside the base portion 11 by, for example, opening a lid provided on a bottom face of the base portion 11.

The base portion 11 and the display panel periphery part 14 are made of a CFRP (Carbon Fiber Reinforced Plastic) containing titanium, for example, from the necessity of enhancing the durability. However, since this material does not transmit electric wave, a plastic material of ABS is employed only for a region where the diversity antenna 15 is provided. The diversity antenna 15 having a better reception sensitivity is automatically selected from two antennas. The wireless LAN card is a composite card having multiple functions including a wireless LAN and a modem function, and the connector conforms with the mini PCI (miniPCI) standard.

Figure 2:
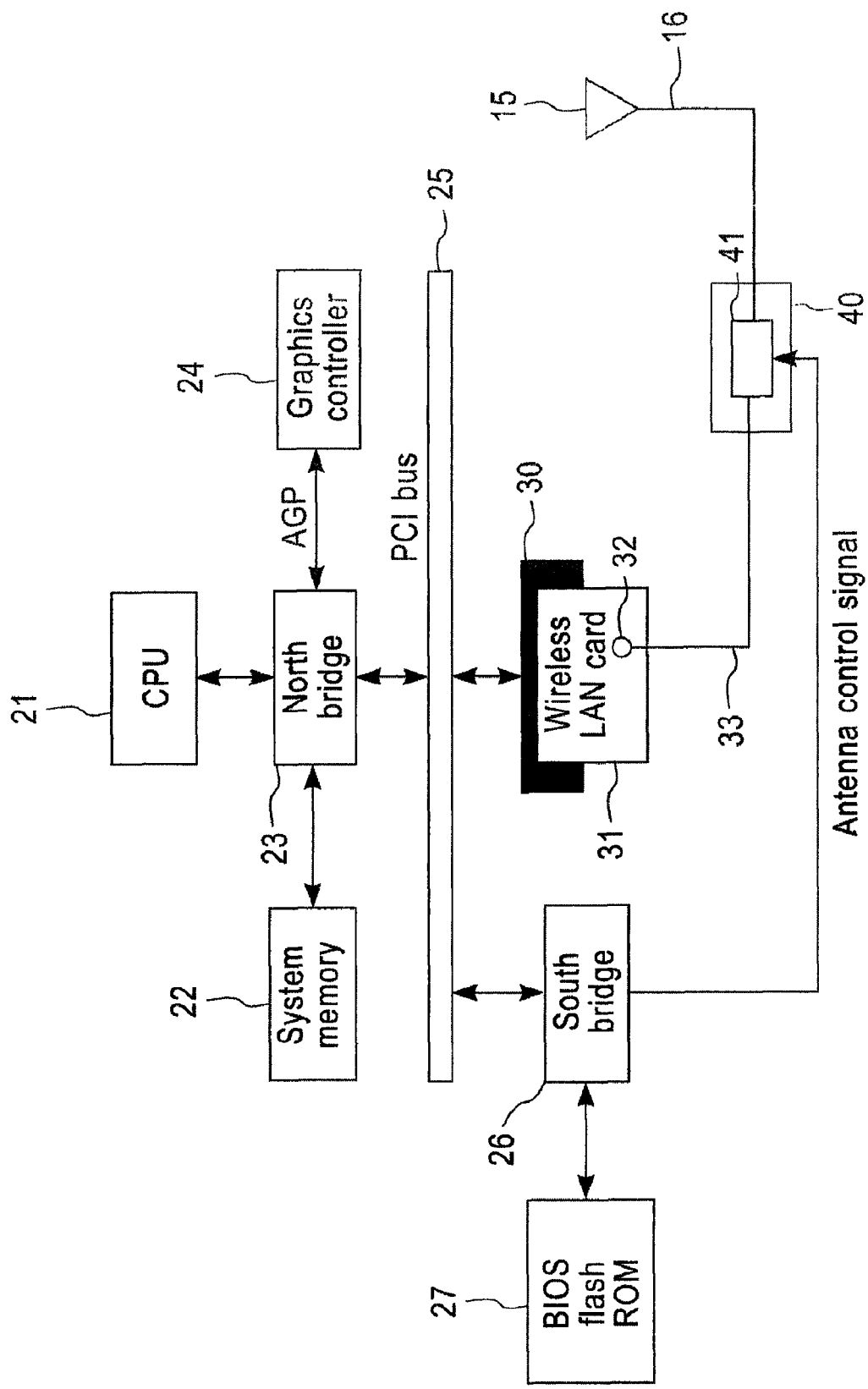
FIG. 2 is a block diagram showing the system configuration of the computer according to the embodiment of the invention.

FIG. 2 is a block diagram showing the system configuration of the computer according to the embodiment of the invention. This computer comprises a CPU 21 for executing the utility programs and various kinds of programs under the control of OS, and operating as a brain of the overall computer system, a system memory 22 that is a main storage, a north bridge 23 for controlling the CPU 21 and the system memory 22, and a graphics controller 24 that is a graphics mechanism connected via AGP (Accelerated Graphics Port). Also, the north bridge 23 is interconnected via a PCI (Peripheral Component Interconnect) bus 25 to each component.

The PCI is the bus that can make data transfer at relatively high speed and normalized in accordance with the specification in which the data bus width is 32 bits or 64 bits, the maximum operation frequency is 33 MHz or 66 MHz, and the maximum data transfer rate is 132 MB/sec or 528 MB/sec. A south bridge 26 for controlling the input/output (I/O) of a hard disk (not shown), a keyboard (not shown), a mouse (not shown), and a Track Point (Trademark of IBM Corporation, Armonk, N.Y.) is connected to this PCI bus 25, and connected to a BIOS flash ROM 27 storing a BIOS (Basic Input/Output System) program for controlling the device connected to the system. A mini PCI slot 30 is connected to the PCI bus 25, and can accept a wireless LAN card 31 conforming to the miniPCI standards. The BIOS flash ROM 27 stores the identification information of network controller (device) having the specification approval in combination with the wireless antenna for the wireless communication as a device table.

If fitted via the mini PCI slot 30 into the motherboard, the wireless LAN card 31 is connected via an antenna connector 32 through a coaxial cable 33 to an antenna switch card 40 (antenna switch circuit when provided on the motherboard). This antenna switch card 40 is provided with a switch device 41. One terminal of the switch device 41 is connected to the coaxial cable 33 for passing an RF (Radio Frequency) signal that is a radio signal, the other being connected to a cable 16 leading to the diversity antenna 15. Also, the switch device 41 switches the connection/disconnection between the coaxial cable 33 and the cable 16 in accordance with an antenna control signal from the south bridge 26.

The antenna switch card 40 is fitted inside the laptop PC. This antenna switch card 40 is provided at a position not accessible or untouchable by the user, even when there is a window (opening portion) opened into a bottom face of the base portion 11 to fit the wireless LAN card 31 into the mini PCI slot 30. That is, by disposing the antenna switch card 40 inside to be inaccessible by the user, it is possible to prevent improper bypass of the antenna cable by the user.

The switch device 41 is turned off in an initial state, or set off at default. In this embodiment, even when the wireless LAN card 31 is fitted in the system, the RF signal can not be released unless the switch device 41 is turned on.

Figure 3:
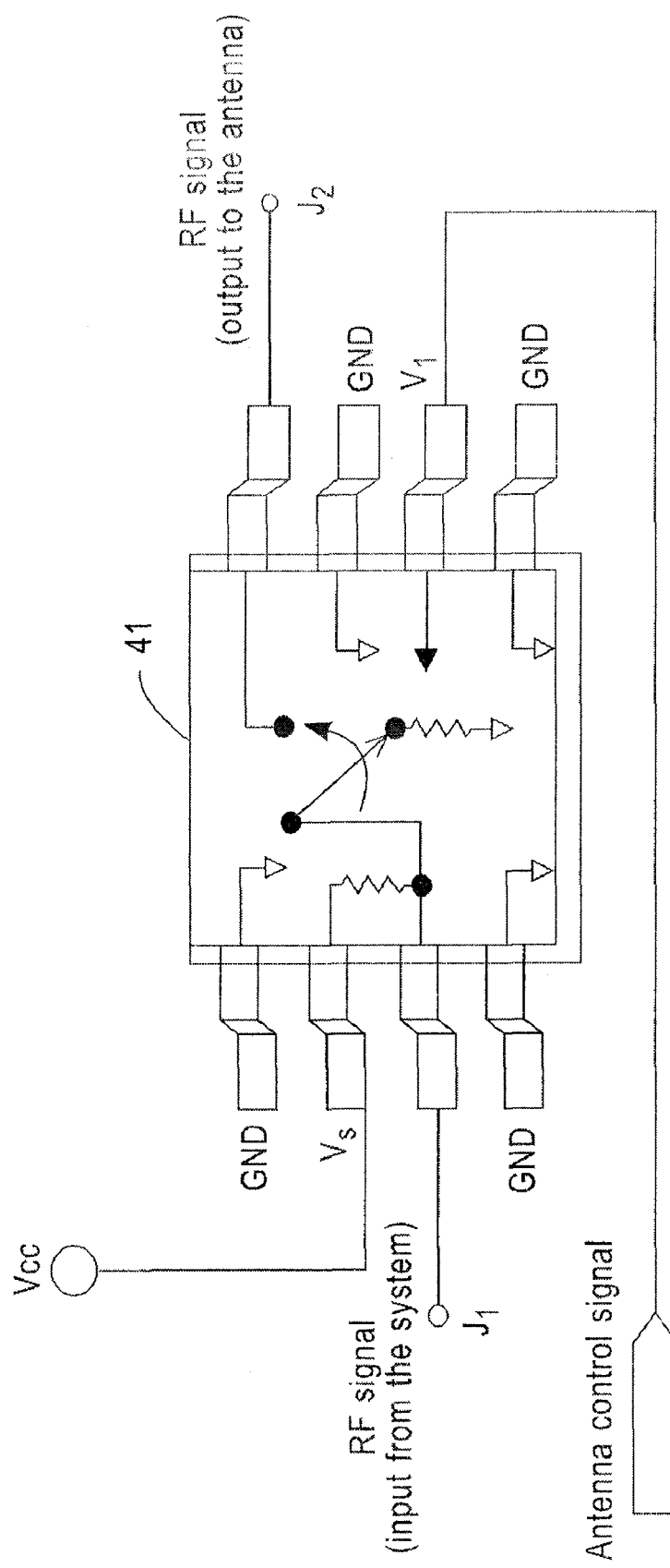
FIG. 3 is a diagram showing the configuration of a switch device.

FIG. 3 is a diagram, showing the configuration of the switch device 41. At one terminal (J1 side) of the switch device 41, an RF signal from a wireless LAN subsystem provided on the wireless LAN card 31 is entered through the coaxial cable 33. Also, an RF signal to the diversity antenna 15 is inputted at the other terminal (J2 side). An antenna control signal from the south bridge 26 is entered at the other terminal (V1) of the switch device 41. For example, if the antenna control signal turns Low (0 V), J1 and J2 are connected, so that an RF signal is passed from the wireless LAN subsystem to the diversity antenna 15. On the other hand, if the antenna control signal turns High (VHigh), J1 and J2 are disconnected, so that the connection between the wireless LAN card 31 and the diversity antenna 15 is inhibited.

Figure 4:
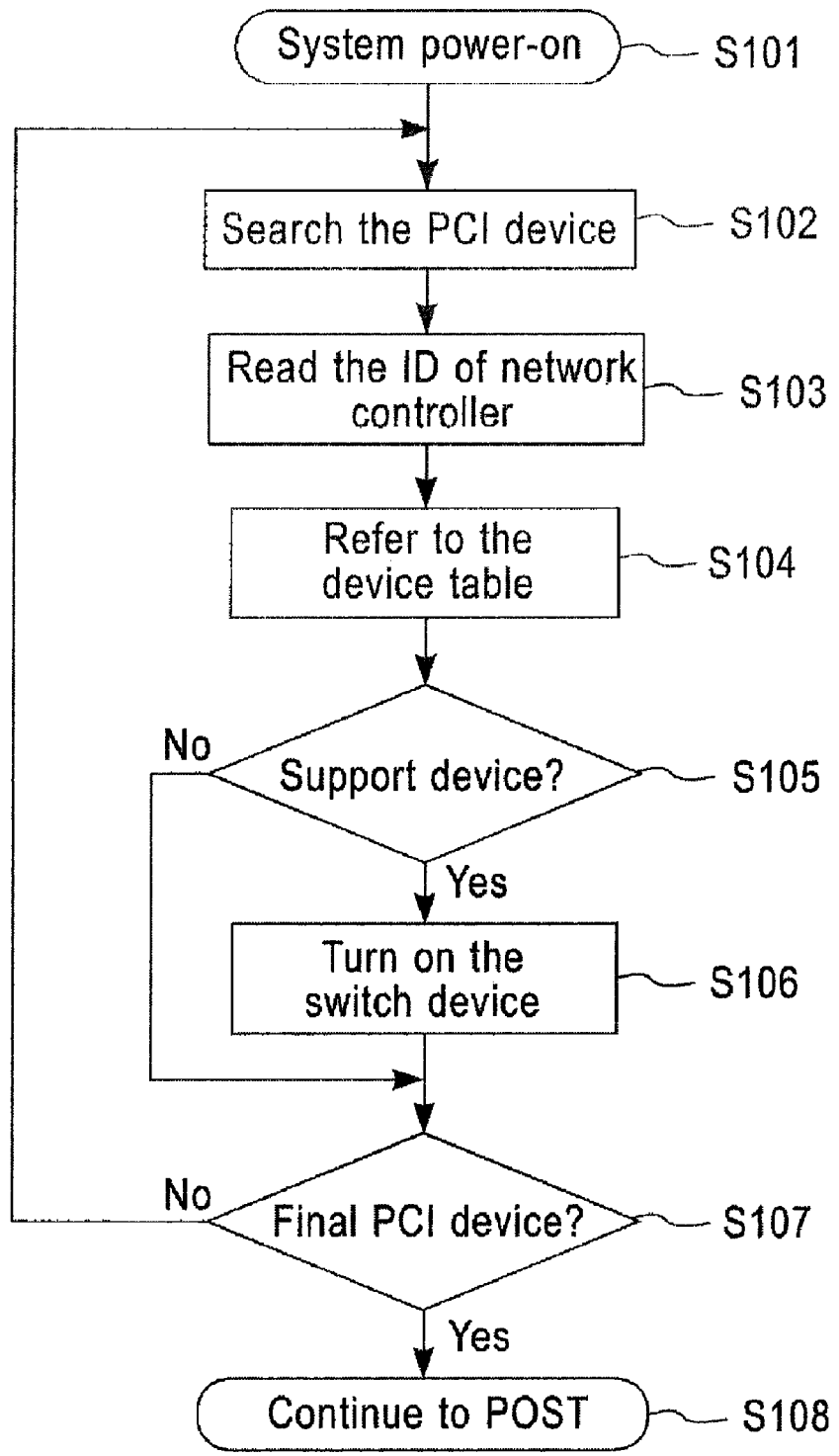
FIG. 4 is a flowchart showing a process for making the connection/disconnection between antenna and controller.

FIG. 4 is a flowchart showing a process for making connection/disconnection between the antenna and the controller. First of all, the system is powered on (step 101), and the PCI bus is examined for a specific PC device (step 102). More specifically, the device to be found has a Base Class of the value 02h (Network Controller) attached on Bus:2. Herein, there are mini PCI, EDC/MDC, PC card controller, and docking station PCI-PCI attached on Bus:2 at present.

PCI ID of the network controller found is read by the BIOS as recognizing means (step 103). The PCI IDs include a device ID, a vendor ID (ID designating a card supply company), a subsystem ID (ID uniquely designating the card), and a subsystem vendor ID. For these IDs, a device table stored in the BIOS flash ROM 27 is referred to (step 104). The IDs stored in the device table are the identification information of network controller (supported device information) and approved to be compatible in accordance with the international standards IEEE802.11b in combination with the diversity antenna 15 that is the wireless antenna. For example, the device table as storage means stores the device ID, vendor ID, subsystem ID, and subsystem vendor ID having specification approval for each product. The stored ID may be one or more kinds for one product.

Then, a determination is made whether or not the device is supported in the note PC by referring to the supported device information stored in this device table and the ID read from the device configuration space (step 105). More specifically, this determination is made based on whether or not the supported device information stored in the device table and the recognized identification information (ID) are matched (coincident). If it is determined that the device is supported, the switch device 41 is turned on, employing an antenna control signal (step 106). If the device is not supported, the operation goes to the next step without turning on the switch device 41. Thereafter, considering the cases where one device deals with a plurality of functions, and a plurality of slots exist, a determination is made whether or not the device is final PCI device (step 107). If the device is not the final PCI device, the operation returns to step 102, or if there are no more PCI devices to examine, the operation continues to a power on self test (POST) (step 108).

Thus, in this embodiment, when the user starts up the system, the BIOS checks the subsystem ID of the mini PCI board, for example, and determines whether or not the inserted or fitted card is allowed to operate in the wireless system. When the ID is recognized in a supported device list, the switch device 41 which defaults to the off state is turned on to enable the radio communication with the wireless antenna. If the ID in the list is not recognized, the switch device 41 is not switched. Thereby, even when the antenna and the controller are separately permitted, the controller mounted on the system is limited to have the specification approval.

The mini PCI device to be fitted may be a composite card having the functions of a wireless LAN and a modem function, for example. In this case, according to this embodiment, only the wireless LAN functions that are not certified are inhibited and all other functions are enabled and made active.

As another embodiment, a method for disabling the system boot (aborting the start sequence) when the controller without specification approval is connected will be described below.

Figure 5:
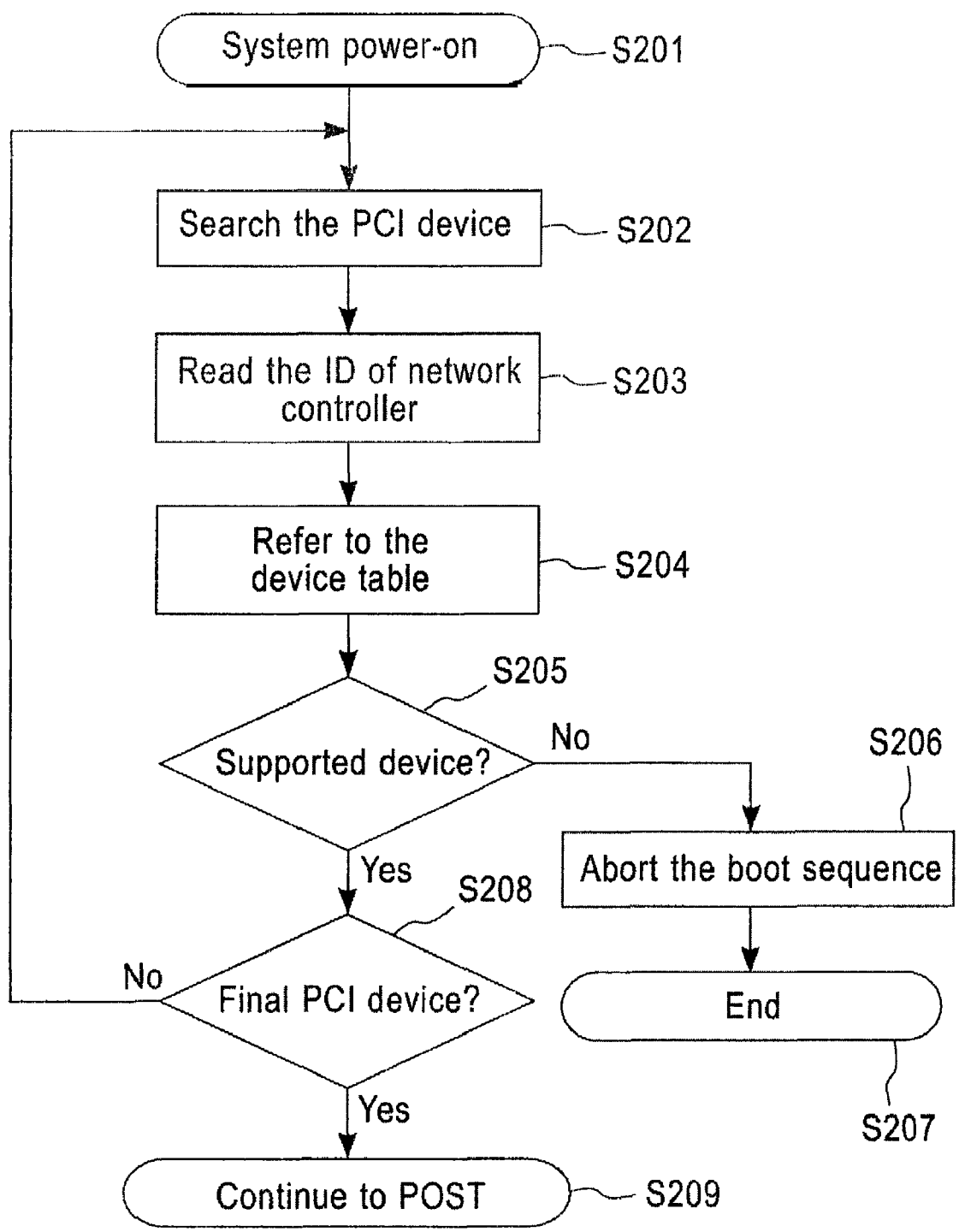
FIG. 5 is a flowchart showing a process for ending a boot sequence depending on whether or not the device is supported.

FIG. 5 is a flowchart showing a process for ending a boot sequence (start sequence) depending on whether or not the device is supported. First of all, the system is powered on (step 201), and the PCI device is searched by the BIOS that is executed by the CPU 21 as recognition means (step 202) in the same way as in FIG. 4. Then, PCI ID of the network controller found is read (step 203). The PCI IDs include a device ID, a vendor ID, a subsystem ID, and a subsystem vendor ID. These IDs are referred to a device table stored in the BIOS (step 204). The IDs stored in the device table are the identification information of network controller approved to be compatible in accordance with the standards in combination with the diversity antenna 15 that is the wireless antenna. Then, a determination is made whether or not the device is supported in the note PC by referring to the device table and the read ID (step 205). The processes up to this step are the same as shown in FIG. 4.

At step 205, if the device is not supported, the boot sequence is terminated or aborted (step 206), and the processes are ended (step 207). At step 205, if the device is supported, a determination is made whether or not the device is the last PCI device to query (step 208). If the device is not the final PCI device, the operation returns to step 202, or if the device is the final PCI device, the operation continues to the power on self test (POST) (step 209). When the boot sequence is ended at step 206, for example, a message indicating "Unpermitted network card is plugged in. Turn off the power and remove the mini PCI network card" is displayed and system is shutdown.

Thus, in the embodiment of FIG. 5, as a function of limiting the controller connected to the system, when the apparatus's POST executes, any mini PCI device not certified or specification approved is rejected. Thereby, even when the antenna and the controller are permitted to operate separately, but are not certified for operation together, the controller's operation is limited in this simple configuration.

As above described in detail, with this embodiment, when the wireless antenna and the controller have separately the legal approval, the controller provided for the system is simply limited. In gaining the legal approval regarding the radio of each country, when the radio LAN card is also employed in other systems permanently mounted with the same antenna, if the wireless antenna and the radio LAN card are detachably connected, legal approval regarding the combined use of the radio and antenna is easily obtained.

PCI or PCMCIA (Personal Computer Memory Card International Association) devices have configuration information including an ID designating the function of the device or card. This ID is only able to roughly identify whether the card is graphic adapter or network adapter. This is true with other peripheral interfaces (e.g., USB). Accordingly, this embodiment is not limited to devices conforming to the PCI standards, but may be broadly employed for PCMCIA and USB compliant devices.

In the drawings and specifications there has been set forth a preferred embodiment of the invention and, although specific terms are used, the description thus given uses terminology in a generic and descriptive sense only and not for purposes of limitation. While the present invention has been described with respect to the embodiment of the invention, the technical scope of the present invention is not limited to the described embodiment. Various changes and modifications may be made in the described embodiment. As is apparent from the description in the appended Claims, modes of the present invention characterized by such changes and modifications are also included in the technical scope of the invention.

We claim as our invention:

1. An apparatus comprising:
a wireless antenna;
a network card which provides wireless communications through said wireless antenna and which removably connects to said apparatus;
a storage device, coupled to said network card, which stores identification information of said network card which has specification approval to operate with said wireless antenna for a wireless communication;
a recognition unit, coupled to said network card, which recognizes the identification information of said network card; and
an abort unit, coupled to said network card, for terminating a start sequence when the identification information recognized by said recognition unit is not found to match the stored identification information.

2. The apparatus of claim 1, further comprising:
a display, coupled to said abort unit, which displays a message indicating that said network card does not have the specification approval for using said antenna before said abort unit terminates the start sequence of said apparatus.

3. The method of claim 2, further comprising a step of:
displaying an information message indicating that the network controller does not have the specification approval required for wireless communications before aborting the start sequence of the apparatus.

4. A method comprising the steps of:
mounting a device to provide wireless communications on an apparatus;
recognizing the identification information of the device from the mounting step;
determining whether the device contains a network controller having a specification approval for wireless communication use in combination with a wireless antenna based on the identification information recognized in said recognizing step; and
aborting a start sequence of the apparatus when it is determined that the device does not contain the network controller having the specification approval.

* * * * *